US009367624B2

(12) United States Patent
Chin et al.

(10) Patent No.: US 9,367,624 B2
(45) Date of Patent: Jun. 14, 2016

(54) IDENTITY WORKFLOW THAT UTILIZES MULTIPLE STORAGE ENGINES TO SUPPORT VARIOUS LIFECYCLES

(71) Applicant: Yahoo! Inc., Sunnyvale, CA (US)

(72) Inventors: Lawrence Chin, San Francisco, CA (US); Tairji Lee, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 142 days.

(21) Appl. No.: 13/725,729

(22) Filed: Dec. 21, 2012

(65) Prior Publication Data

US 2014/0181104 A1    Jun. 26, 2014

(51) Int. Cl.
*G06F 17/30* (2006.01)
*H04L 29/08* (2006.01)

(52) U.S. Cl.
CPC ........ *G06F 17/30867* (2013.01); *H04L 67/306* (2013.01)

(58) Field of Classification Search
CPC ..................... G06F 17/30312; G06F 17/30091
USPC ......................................................... 707/736
See application file for complete search history.

(56) References Cited

U.S. PATENT DOCUMENTS

| | | | |
|---|---|---|---|
| 2002/0178086 A1* | 11/2002 | Margeson et al. | 705/26 |
| 2010/0274795 A1* | 10/2010 | Rallapalli et al. | 707/769 |
| 2012/0276870 A1* | 11/2012 | Davis et al. | 455/407 |
| 2013/0073547 A1* | 3/2013 | Pereyra-Rozas | 707/736 |
| 2013/0191464 A1* | 7/2013 | Burckart et al. | 709/206 |
| 2013/0311256 A1* | 11/2013 | Inks | 705/14.15 |

OTHER PUBLICATIONS

Oracle, Sun Java System Message Queue 3.7 UR1 Administration Guide, 2010 (4 page).
SQL—Wikipedia, the free encyclopedia (2012), (15 pages).

* cited by examiner

*Primary Examiner* — Rehana Perveen
*Assistant Examiner* — Alexander Khong
(74) *Attorney, Agent, or Firm* — Weaver Austin Villeneuve & Sampson LLP

(57) ABSTRACT

In one embodiment, an indication of a request pertaining to a user account is obtained, where the user account is associated with at least one user. An account type of the user account is determined, where the account type is one of two or more account types. One or more actions indicated by the request are performed based, at least in part, upon the account type.

25 Claims, 8 Drawing Sheets

IDENTITY WORKFLOW THAT UTILIZES MULTIPLE STORAGE ENGINES TO SUPPORT VARIOUS LIFECYCLES

BACKGROUND

The disclosed embodiments relate generally to methods and apparatus for processing requests pertaining to user accounts.

User accounts may be created or set up for a variety of purposes. More particularly, user accounts may enable users to access a computer system or Internet services such as electronic mail. In addition, users may purchase goods or services in association with user accounts.

A user account may be an Internet-based entity owned by or assigned to a particular user, but stored and maintained by an organization. Since the organization may maintain an enormous number of accounts, managing these accounts can be a time consuming and complex task.

SUMMARY

The disclosed embodiments enable requests pertaining to user accounts to be processed. More particularly, requests may be processed based, at least in part, upon an account type of the user accounts and/or a request type of the requests.

In one embodiment, an indication of a request pertaining to a user account may be obtained, where the user account is associated with at least one user. A request type of the request may be determined. In addition, an account type of the user account may be determined, where the account type is one of two or more account types. One or more actions indicated by the request may be performed based, at least in part, upon the account type and/or the request type.

In another embodiment, an indication of a request pertaining to a user account may be obtained, where the user account is associated with at least one user. An account type of the user account may be determined, where the account type is one of two or more account types. One or more actions indicated by the request may be performed based, at least in part, upon the account type.

Various embodiments may be implemented via a device comprising a processor, memory, and a display. The processor and memory are configured to perform one or more of the above described method operations. Other embodiments may be implemented via a computer readable storage medium having computer program instructions stored thereon that are arranged to perform one or more of the above described method operations.

These and other features and advantages of the disclosed embodiments will be presented in more detail in the following specification and the accompanying figures which illustrate by way of example the principles of the disclosed embodiments.

DETAILED DESCRIPTION OF THE SPECIFIC EMBODIMENTS

Figure 1:
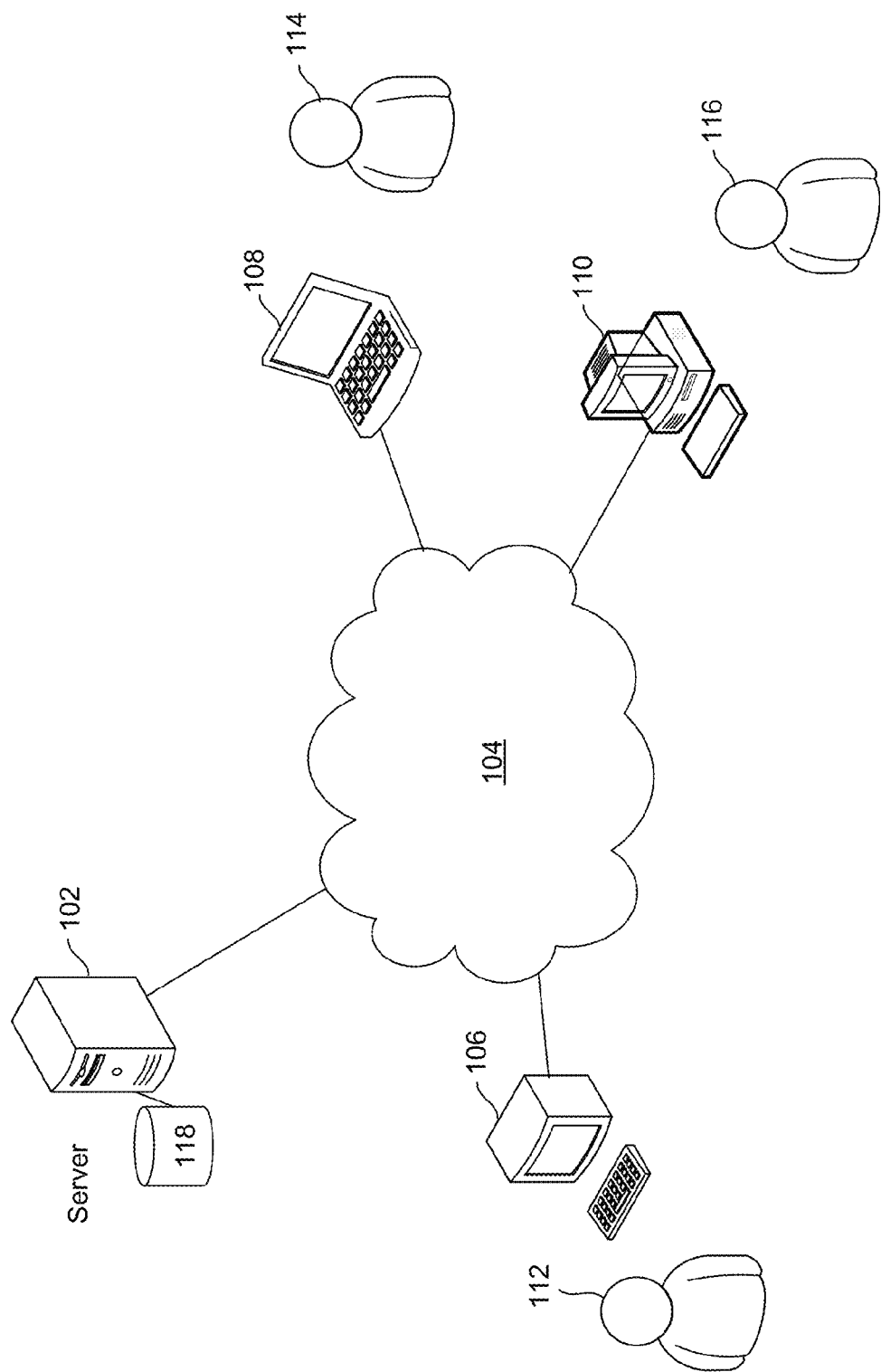
FIG. 1 is a diagram illustrating an example system in which embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

User accounts may have a complex relationship with one another. For example, two or more accounts such as partner accounts may depend upon one another. As another example, an account (e.g., a partner account) may control the account lifecycle of another account (e.g., another partner account). Accordingly, account lifecycles can be complex.

In some instances, accounts may be entirely independent from one another. As a result, there may be many unused (e.g., orphaned) accounts. It may therefore be desirable to eliminate these unused accounts. To support the removal of millions of inactive accounts, it may be desirable to implement fast performance. However, to manage complex accounts, which may not be independent from one another, it may be desirable to implement a system with high flexibility that can support dynamic scheduling and timing. Unfortunately, these two goals can be conflicting.

In accordance with various embodiments, processing of requests (i.e., commands) pertaining to user accounts of various account types may be implemented by various lifecycles for which different types of processing behaviors are performed. Such processing behaviors may include different types of scheduling, queuing, and/or storage behaviors, which will process the appropriate action(s) according to the proper timeline. For example, an account may be deactivated, but the data maintained in association with the account may be deleted 90 days after the account is deactivated.

Various storage engines and databases have various limitations and benefits. As a result, using a single storage engine or database can be difficult. Therefore, as will be described in further detail below, multiple storage engines, databases, and/or queues may be implemented.

As will be described in further detail below, an account workflow system may manage various types of accounts and requests (i.e., commands) pertaining to the accounts through the use of various storage engines, databases, and/or queues. More particularly, the account workflow system may adjust its queuing and/or storage behavior by utilizing multiple storage engines, databases, and/or queues. The account workflow system may examine a request pertaining to an account and based upon a type of the request, an account type of the account, and/or state of the account, the request may be processed in an optimal manner by storing information pertaining to the request to a selected storage engine, database, and/or queue. In this manner, the account workflow system may manage different account lifecycle models.

Example System

FIG. 1 is a diagram illustrating an example system in which various embodiments. As shown in FIG. 1, the system may include one or more servers 102, which may be associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, users of the web site may create, activate, update, delete, deactivate, or otherwise change the status or state of user accounts by submitting a corresponding request. In addition, users of the web site may access user accounts or public user profiles, interact with other members of the web site, upload files (e.g., photographs, videos), purchase goods or services, access information posted on the web site, etc.

In this example, the server(s) 102 may obtain or otherwise receive data (e.g., account data and/or user profile) and/or requests (e.g., search requests or account requests pertaining to a particular user account). Requests may include those generated automatically within the system (e.g., in response to a particular user event or type of user event). Moreover, requests may include requests sent via the Internet 104 from one or more computers 106, 108, 110 in association with corresponding entities 112, 114, 116, respectively. For example, each of the entities 112, 114, 116 may be an individual such as a user of the web site or an individual operating on behalf of a group of individuals (e.g., group, business, company, or web site).

The server(s) 102 may have access to one or more data stores 118, which may include one or more memories. More particularly, the data stores 118 may include one or more master account data store(s) (e.g., account databases), which may include account information (e.g., data) for a plurality of user accounts. Therefore, information pertaining to user accounts may be retained in one or more memories that are coupled to the server 102.

In addition, the data stores 118 may include two or more types of data stores for use in processing account requests. For example, the data stores 118 may include one or more relational databases (e.g., SQL databases), as well as one or more non-relational databases (e.g., non-SQL databases). Example processes for implementing two or more types of data stores will be described in further detail below.

Each user account may be associated with at least one user. An account may be associated with an individual or group. Moreover, a sub-account of one individual may be linked to a master account (e.g., parent account) of another individual (or group of individuals). In this manner, an account may be associated with a child, as well as a parent of the child. Similarly, partner accounts may be linked to one another, enabling a partner account to control the account lifecycle of another partner account.

A user account may pertain to goods or services provided to the user and/or goods or services that are available to the user. More particularly, the user account may indicate an amount of the goods or services provided to the user during a period of time and/or an amount charged to the user for the goods or services provided to the user during the period of time. In addition, the user account may indicate an amount of goods or services available to the user. For example the user account may indicate an amount of cell phone time that is available to the user via their mobile phone services provider. The user account may be managed by a company that provides goods or services to the user or another entity such as an Internet Services Provider.

A request may initiate the performance of a set of one or more actions with respect to an account. For example, an account may be accessed (e.g., queried), created, updated, suspended, activated, deactivated, or deleted in response to a request. A request may be one of a number of types of requests. Example request types include, but are not limited to, an access request indicating a request to obtain or otherwise view information from an account, a create request indicating a request to create an account, an update request indicating a request to update an account, a suspend request indicating a request to suspend an account, an activate request indicating a request to activate an account (e.g., from an inactive status to an active status), a deactivate request indicating a request to deactivate an account to an inactive status, and a delete request indicating a request to delete an account. For instance, a suspend request may be sent in response to abusive or inappropriate activity by the user of the user account. The server(s) 102 may receive a request and process the request, as will be described in further detail below.

A request may be generated by the system in response to a trigger such as a particular online activity of the user or a complaint pertaining to the user that has been received from another individual or user. Alternatively, a request may be submitted by a user associated with the account or a user of another account (e.g., master account) linked to the account. Moreover, a request may be submitted by an owner of the account, an individual employed by the owner of the account, or an individual employed by a company or web site providing access to the account.

Upon performing the set of actions in response to a particular request, the account information for the user account may be queried and/or modified accordingly. More particularly, account information associated with the user account that is retained in the data stores 118 may be queried, stored, deleted, updated, or otherwise modified. For example, the account information may indicate that a particular request has been received and processed. As another example, the account information may indicate a change in status of the account (e.g., from active to suspended).

The account information retained in the data stores 118 may include personal information such as demographic information (e.g., age and/or gender) and/or geographic information (e.g., residence address, work address, and/or zip code). Moreover, the account information may include financial information such as credit card information, enabling goods or services provided in association with the account to be purchased. In addition, the account information may include information pertaining to goods or services available to the user via the user account or used by the user. More particularly, the account information may indicate an amount and/or quality of the goods or services available to the user or used by the user. In addition, the account information may indicate a cost associated with the amount and/or quality of goods or services available to the user or used by the user.

The account information may also include or be linked to additional information pertaining to the user. For example, the server(s) 102 may have access to additional user information stored in the data stores 118. For example, user information may be retained in one or more user logs. This user information or a portion thereof may be referred to as a user profile. More particularly, the user profile may include public information that is available in a public profile and/or private information. Furthermore, the user profile may include information that has been submitted by the user and/or information that has been deduced or automatically collected by the system (e.g., based upon user action(s)). The user logs 118 may be retained in one or more memories that are coupled to the server 102.

The user information retained in the user logs 118 may include personal information such as demographic information (e.g., age and/or gender) and/or geographic information (e.g., residence address, work address, and/or zip code). In addition, each time a user performs online activities such as clicking on an advertisement, purchasing goods or services, posting information or content (e.g., on a web site or within the user's public profile), or annotating content, information regarding such activity or activities may be retained as user data in the user logs 118. For instance, the user data that is retained in the user logs 118 may indicate the identity of web sites visited, identity of ads that have been selected (e.g., clicked on) and/or a timestamp. Moreover, where the online publisher supports a search engine (e.g., via the server 102 or a separate search server), information associated with a search query, such as search term(s) of the search query, information indicating characteristics of search results that have been selected (e.g., clicked on) by the user, and/or associated timestamp may also be retained in the user logs 118. A user may be identified in the user logs 118 by a user ID (e.g., user account ID), information in a user cookie, etc.

In one embodiment, as an individual interacts with a software application, e.g., an instant messenger or electronic mail application, descriptive content such as, for example, an email address, instant messenger identifier, phone number, postal address, message content, date, time, etc., may be identified and stored. Descriptive content may be stored along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed or stored in memory. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such as for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Through the use of user profiles of a search engine, for example, a search engine provider may to retrieve annotations, tags, stored pages, navigation history, or the like, which may be useful for making relevance determinations of search results, such as with respect to a particular user.

Figure 2:
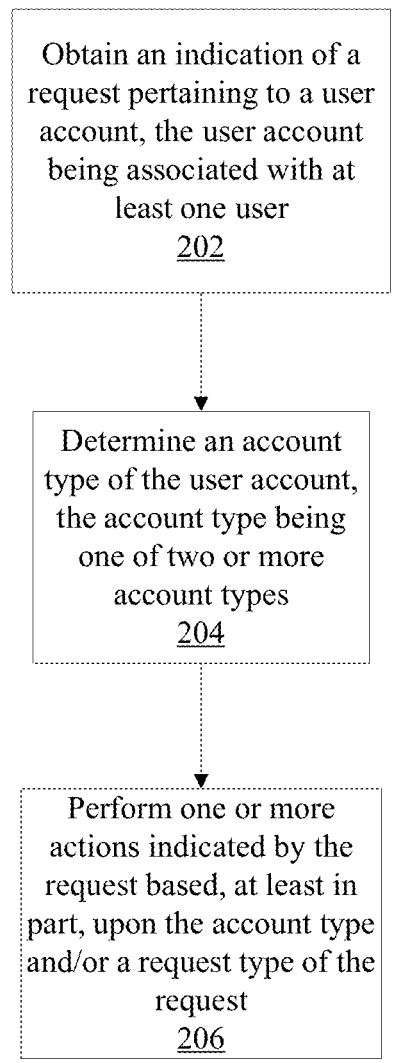
FIG. 2 is a process flow diagram illustrating an example method of processing a request in accordance with various embodiments.

FIG. 2 is a process flow diagram illustrating an example method of processing a request in accordance with various embodiments. An indication of a request pertaining to a user account may be obtained at 202, where the user account is associated with at least one user. More particularly, the indication of the request may be obtained in the form of a request message or another mechanism. As set forth above, the request may be generated in response to a trigger such as a particular online activity of the user or a complaint pertaining to the user that has been received from another individual or user. Alternatively, the request may be submitted by a user associated with the account or a user of another account (e.g., master account) linked to the account. Moreover, a request may be submitted by an owner of the account, an individual employed by the owner of the account, or an individual employed by a company or web site providing access to the account. Similarly, the request may be submitted by an individual employed by a company providing goods or services to the user in association with the account.

An account type of the user account may be determined at 204, where the account type is one of two or more account types. Example account types include, but are not limited to, a simple account (e.g., independent account), a complex account (e.g., an account that depends upon another account or that has a lifecycle that depends upon another account), a paid account, a free account, a partner account, a master account (e.g., parent account), a sub-account, an inactive account, or an abusive account.

One or more actions indicated by the request may be performed at 206 based, at least in part, upon the account type and/or a request type of the request. More particularly, the action(s) to be performed may be identified based, at least in part, upon the account type. In addition, the action(s) to be performed may be further identified based, at least in part, upon the request type, other information in the request, account information pertaining to the account such as the state of the account, and/or other information such as user information pertaining to the user. Account information pertaining to the account may be retrieved from the master account database.

The actions may be scheduled such that each of the actions is scheduled to occur at a corresponding time. The actions may then be performed in accordance with the scheduled times. For example, each of the actions may be performed at or after the scheduled times.

In addition, the actions may include a plurality of actions that correspond to a plurality of states in a lifecycle. For example, a suspend account request may corresponding to a first lifecycle, while a deactivate account request may corresponding to a second lifecycle. The plurality of actions may be performed in a particular order in accordance with the plurality of states of the lifecycle. Therefore, the plurality of actions may be performed in a sequential order, which may be indicated by the plurality of states of the lifecycle.

The action(s) to be performed may be identified, scheduled, and/or performed by a request processing engine, scheduling engine, and/or storage engine that corresponds to the account type, request type, account state, and/or other information. In addition, information pertaining to the request and/or the actions may be stored in at least one queue or data store that corresponds to the account type, request type, account state, and/or other information. The information may be stored in the queue or data store at one or more steps during the processing of the request (e.g., to schedule or perform the action(s)). Thus, the information that is stored in the queue or data store may be deleted during the processing of the request or after the processing of the request is completed. In addition, the information that is stored in the queue or data store may be stored upon completion of the processing of the request. As a result, the information that is stored in the queue or data store may be retained after the processing of the request is completed (e.g., after the action(s) have been performed).

In accordance with various embodiments, one of two or more request processing engines, schedulers, storage engines, data stores and/or queues may be selected based, at least in part, upon the account type. Moreover, one of two or more request processing engines, schedulers, storage engines, data stores or queues may be selected based, at least in part, upon a request type of the request, a state of the account, and/or other information. Information pertaining to the user account (e.g., account identifier or state of the account), the request and/or at least one of the one or more actions indicated by the request may be stored in the selected one of the two or more data stores or queues. Similarly, the information in the selected data store or queue may be updated, deleted, or queried.

A first subset of the two or more data stores (or queues) may include or consist of one or more relational databases (e.g., SQL databases), while a second subset of the two or more data stores (or queues) may include one or more types of databases that do not include a relational database (e.g., SQL database). Thus, a data store may be selected from the first subset or the second subset based, at least in part, upon the account type, the request type, and/or the state of the account.

In accordance with various embodiments, requests that involve more significant processing or querying may be processed, at least in part, using a relational database (e.g., SQL database). Similarly, requests pertaining to particular account types that involve significant processing or querying may be processed, at least in part, using a relational database. More particularly, a relational database may link two or more different dependent accounts to one another. Moreover, the relational behavior of a relational database may support flexible scheduling of actions. Thus, where a request pertains to an account type such as a complex account or a partner account, the data store may be selected from the first subset. In other words, the data store that is selected may be a relational database (e.g., SQL database).

Similarly, requests that involve less processing or minimal querying may be processed, at least in part, using a database that is not a relational database (e.g., SQL database). Thus, requests pertaining to particular account types that involve minimal processing or querying may be processed using a relational database (e.g., SQL database). For example, where a request pertains to an account type such as a simple account, the data store may be selected from the second subset. In other words, the data store that is selected may be a non-relational database (e.g., non-SQL database).

A request processing system may support the processing of any number of account types and request types. More particularly, each account type may have a different, corresponding set of request types that are available for processing.

Figure 3:
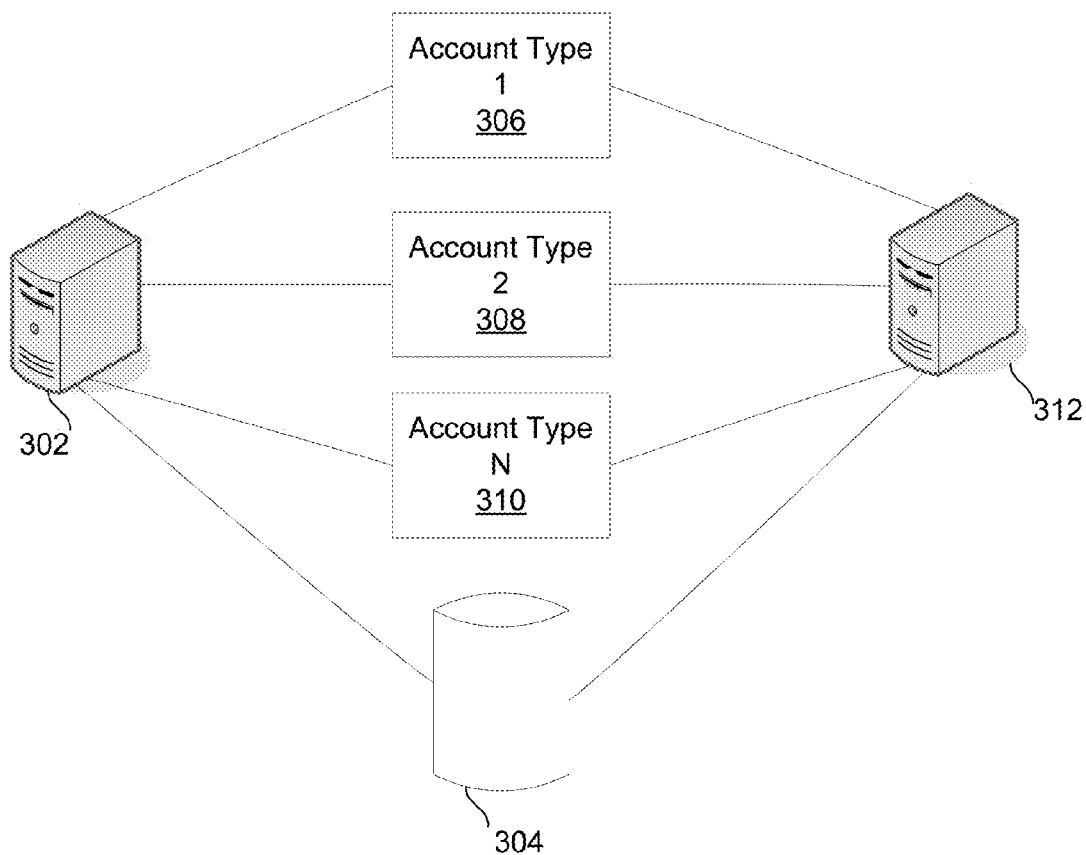
FIG. 3 is a diagram illustrating an example request processing system in which various embodiments may be implemented.

FIG. 3 is a diagram illustrating an example request processing system in which various embodiments may be implemented. A requester may transmit or otherwise provide a request. As set forth above, the requester may be an individual or a system component. As shown in FIG. 3, an indication of a request may be obtained by a network device 302. For example, the network device 302 may receive a request message, or ascertain that a request has been received via a setting or another mechanism. The network device 302 may validate the request.

The network device 302 may determine an account type of the user account to which the request pertains. For example, the network device 302 may obtain an account identifier and/or account type from the request. As another example, the network device 302 may obtain an account identifier from the request and ascertain the account type corresponding to the account identifier from a master account database 304. In addition, the network device 302 may determine, from the request, a request type of the request. The network device 302 may also access a master account database to ascertain a state of the user account.

The network device 302 may implement dispatching logic that examines the type of the request, the type of the user account to which the request pertains, and/or the state of the user account. Thus, the dispatching logic may dispatch or otherwise process the request based, at least in part, upon the type of the user account to which the request pertains, the type of the request, and/or the state of the account to optimize the processing of the request. Such optimization may include the forwarding of the request or associated information to the appropriate request processing engine, scheduling engine, storage engine, database, and/or queue for processing.

In accordance with various embodiments, the network device 302 may "translate" the request to a set of one or more actions based, at least in part, upon the account type, the request type, and/or the state of the account. More particularly, the request may be translated to a series of actions that correspond to states of a lifecycle that pertain to the account type, the request type, and/or the state of the account. The set of actions may then be scheduled and/or performed, as set forth below.

Each of the functional blocks 306, 308, 310 may correspond to a different account type and/or request type. More particularly, each of the functional blocks 306, 308, 310 may correspond to a different request processing engine, scheduling engine, and/or storage engine. Moreover, each of the functional blocks 306, 308, 310 may correspond to a different set of one or more queues and/or one or more data stores. Stated another way, each of the functional blocks 306, 308, 310 may access and/or update an associated set of queues and/or data stores. For example, the functional block 306 may correspond to one or more relational databases (e.g., SQL databases), while functional blocks 308 and 310 may correspond to one or more non-relational databases.

In accordance with various embodiments, the network device 302 may serve as a dispatcher of requests, and provide information pertaining to the set of actions for processing by the appropriate one of the functional blocks 306, 308, 310. More particularly, the network device 302 may provide information pertaining to the set of actions to the appropriate storage engine. For example, the network device 302 may store information pertaining to the set of actions in the appropriate data store(s) or queue(s) (e.g., corresponding to the selected storage engine). This information may be stored, for example, in the form of one or more data store records or one or more queue entries. This information may include an account identifier. In addition, the information may indicate an account type, a request type, the specific actions to be performed, and/or an order in which the actions are to be performed. For example, the information may indicate a processing time corresponding to each of the actions. This may be desirable, for example, where a particular action is to be performed after a delay of a particular number of days or after a particular date and/or time.

The functional blocks 306, 308, 310 may operate as request processors, schedulers, and/or storage engines, which may be implemented together or separately via one or more servers. More particularly, upon receiving a notification of a new request or corresponding set of actions, or otherwise detecting a new request or corresponding set of actions, the functional blocks 306, 308, 310 may operate as schedulers to determine, among a plurality of actions pertaining to one or more requests, a next set of one or more actions to be performed. This may be accomplished, for example, by sorting actions (e.g., entries) in the scheduler's queue(s) according to an order in which the actions are to be performed, and selecting a particular number of the sorted actions. As another example, the scheduler may query its data store(s) for actions that are to be performed within a particular time period (e.g., the next 10 minutes) and select a particular number of these actions. In this manner, a scheduler may identify a next set of actions that have matured to be processed. In accordance with various embodiments, an action may be performed at or after a scheduled time is reached.

Any of the schedulers 306, 308, 310 may provide information pertaining to a set of one or more actions to be performed to a second network device 312, which may operate as a listener. More particularly, the second network device 312 may perform the actions in the order in which they are scheduled and/or received from the schedulers 306, 308, 310. In this manner, the second network device 312 may process actions corresponding to one or more requests in accordance with their associated lifecycles. As the schedulers 306, 308, 310 provide information pertaining a set of one or more actions to be performed to the second network device 312, the schedulers 306, 308, 310 may delete this information from their queue(s) or data store(s). As shown in this example, the schedulers 306, 308, 310 and their corresponding queue(s) or data store(s) may be decoupled from each other. This allows simplicity in dependency and management of the account workflow system.

As the actions are performed, the second network device 312 may update the master account database 304. More particularly, the second network device 312 may update the master account database 304 to change a state of a user account from a first state to a second state. For example, the state of a user account may be changed from active to suspended.

Example Embodiments

Figure 4A:
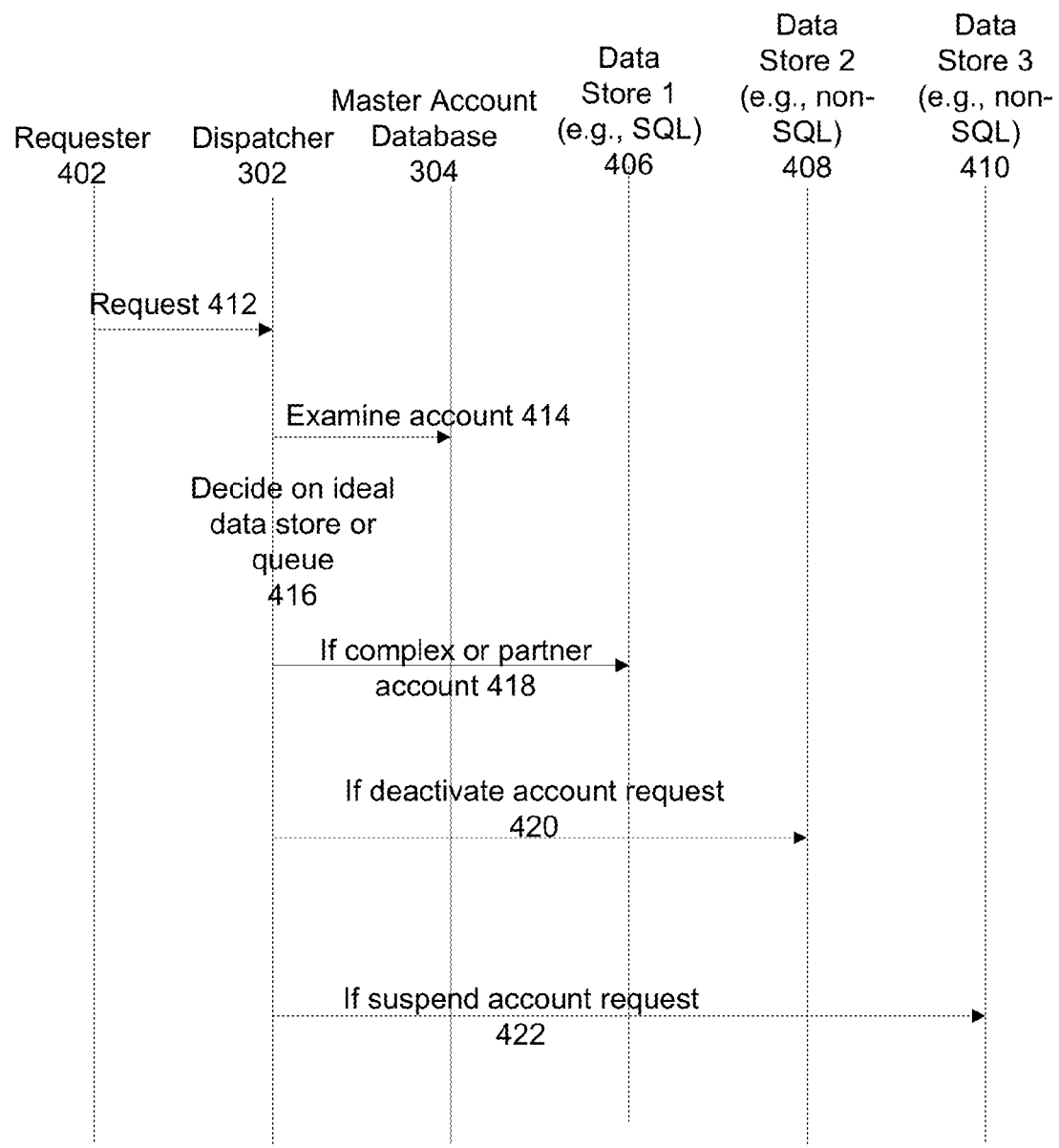
FIG. 4A is a transaction flow diagram illustrating an example method of processing a request within a system such as that illustrated in FIG. 3 in accordance with various embodiments.

FIG. 4A is a transaction flow diagram illustrating an example method of processing a request within a system such as that illustrated in FIG. 3 in accordance with various embodiments. In this example, vertical lines correspond to a Requester 402, a Dispatcher 302, a Master Account Database 304, Data Store 1 406, Data Store 2 408, and a Data Store 3 410, as shown. As shown a Requester 402 may generate an account request 412. Upon detecting the account request, ascertain the type of the account request 412. In addition, the Dispatcher 302 may access the Master Account Database 304 to ascertain the account type of the user account to which the account request pertains and/or a state of the account, as shown at 414. The Dispatcher 302 may then determine an ideal queue or data store based, at least in part, upon the account type of the user account, the request type, and/or the state of the account at 416.

In accordance with various embodiments, information pertaining to a request and/or corresponding actions to be performed in association with a complex account may be stored in a relational database or SQL database. In this example, if the Dispatcher 302 determines at 418 that the account type of the user account is a complex account such as a partner account, the Dispatcher 302 may store information pertaining to the request and/or actions to be performed in association with the request in Data Store 1 406 (e.g., a relational or SQL database). Upon determining that the account type of the user account is not a complex account, the Dispatcher 302 may store information in the data store or queue that corresponds to the request type. For example, if the Dispatcher 302 determines at 420 that the request type is a deactivate account request, the Dispatcher 302 may store information pertaining to the request and/or actions to be performed in association with the request in Data Store 2 408 (e.g., a non-relational database or non-SQL database). Similarly, if the Dispatcher 302 determines at 422 that the request type is a suspend account request (e.g., the user account is an abusive account), the Dispatcher 302 may store information pertaining to the request and/or actions to be performed in association with the request in Data Store 3 410 (e.g., a non-relational database or non-SQL database).

Figure 4B:
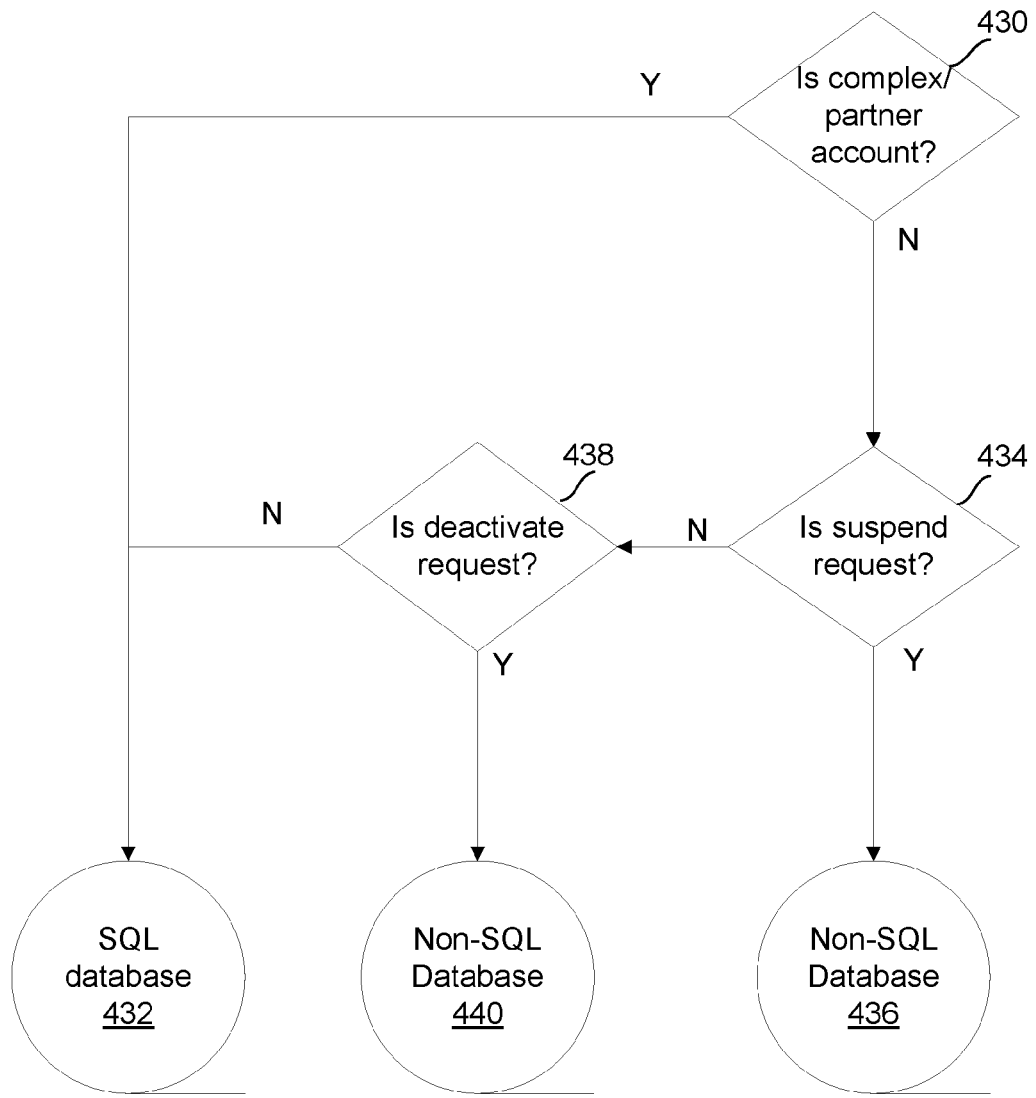
FIG. 4B is a process flow diagram illustrating an example method of processing a request in accordance with various embodiments.

FIG. 4B is a process flow diagram illustrating an example method of processing an account request in accordance with various embodiments. As described above, the Dispatcher 302 may select the optimal data store or queue based, at least in part, upon the account type and/or the request type. In this example, the Dispatcher 302 may first determine whether the account type is a complex account such as a partner account at 430. If the account type is a complex account (e.g., partner account), the Dispatcher 302 may store information pertaining to the request and/or action(s) to be performed in a first database 432, which may be a relational database such as a SQL database. However, if the account type is not a complex account, the Dispatcher 302 may then examine the request type to select the optimum data store. If the request type indicates that the request is a suspend request at 434, the Dispatcher may store information pertaining to the request and/or action(s) to be performed in a second database 436. If the request type indicates that the request is a deactivate request at 438, the Dispatcher may store information pertaining to the request and/or action(s) to be performed in a third database 440. In this example, the second database 436 and third database 440 are non-relational (e.g., SQL) databases. The disclosed embodiments support an account workflow system that can easily be modified or upgraded. More particularly, different types of request processing engines, storage engines, queues, and/or database(s) may be implemented to support different or new account type(s), request type(s), and/or lifecycle behavior. Moreover, additional request processing engine(s), storage engine(s), queue(s) and/or database(s) may be added to increase capacity and performance. Accordingly, the disclosed processes may easily be modified to support the reduction, addition, or modification of the various system components.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Social Network

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally. For example, a "social graph" or "socio-gram" may represent an entity in a social network as a node and a relationship as an edge or a link.

Multi-Modal Communication (MMC)

Individuals within one or more social networks may interact or communicate with other members of a social network via a variety of devices. Multi-modal communication technologies refers to a set of technologies that permit interoperable communication across multiple devices or platforms, such as cellphones, smart phones, tablet computing devices, personal computers, televisions, SMS/MMS, email, instant messenger clients, forums, social networking sites (such as Facebook, Twitter, or Google), or the like.

Network Architecture

Figure 5:
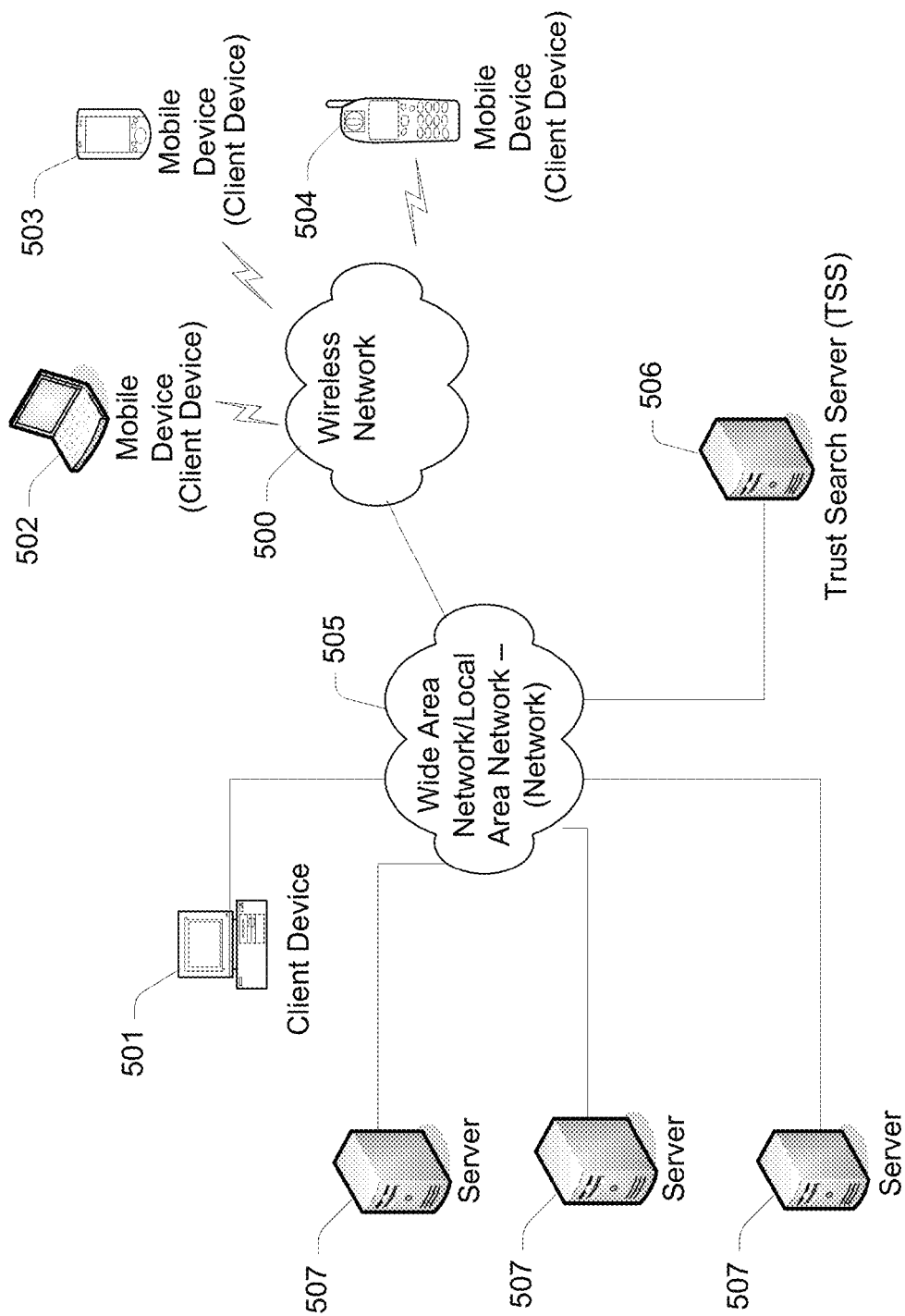
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 505 and wireless network 500, a variety of devices, such as client devices 501-504, and a variety of servers such as content server(s) 507 and search server 506. The servers may also include an ad server (not shown). As shown in this example, the client devices 501-504 may include one or more mobile devices 502, 503, 504. Client device(s) 501-504 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

User accounts may be accessed to facilitate the processing of requests in some centralized manner. This is represented in FIG. 5 by server(s) 507, which may correspond to multiple distributed devices and data store(s). The server(s) 507 and/or corresponding data store(s) may store user account data and other user information. The server(s) 507 may also include one or more content servers.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
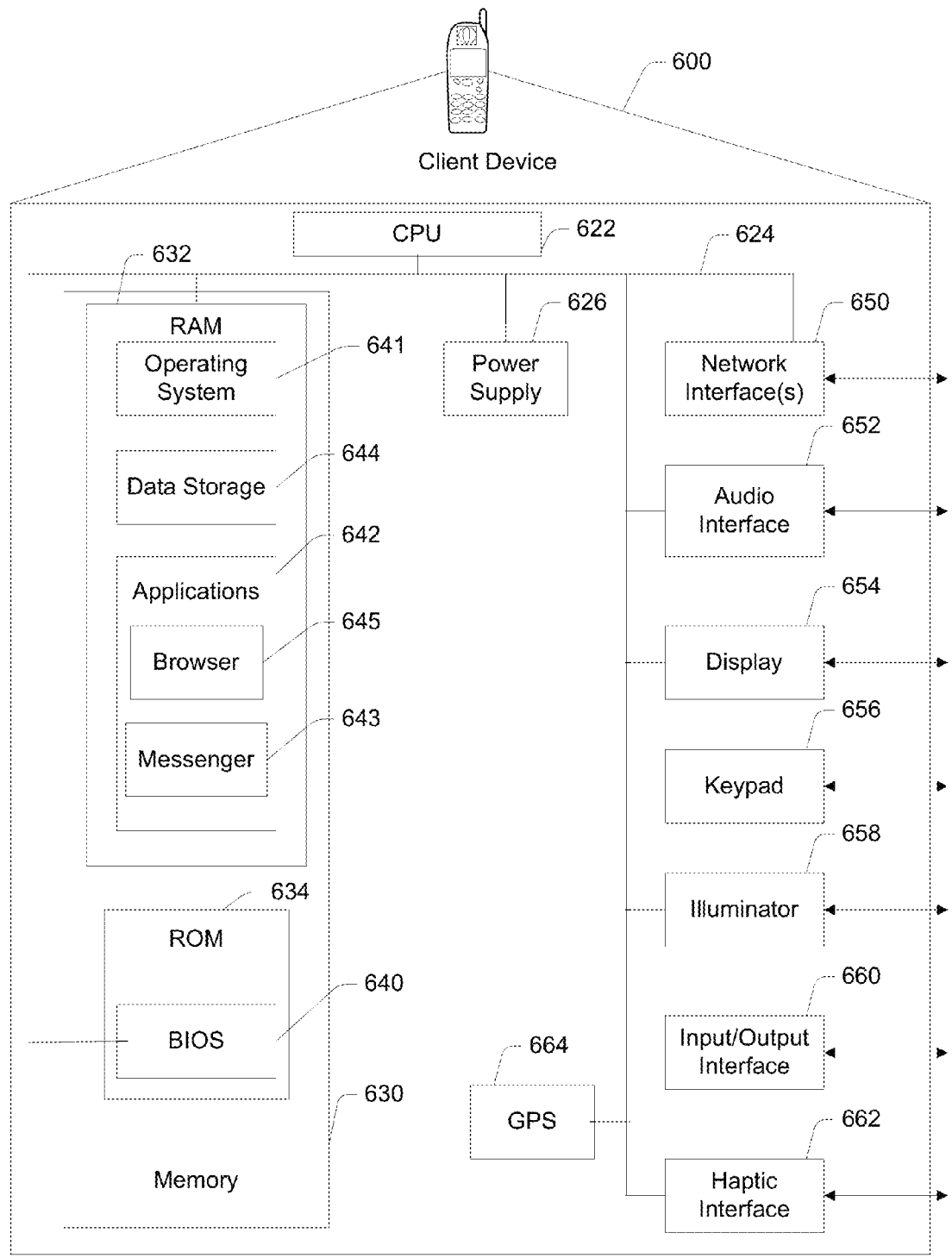
FIG. 6 is a schematic diagram illustrating an example client device in which various embodiments may be implemented.

FIG. 6 is a schematic diagram illustrating an example embodiment of a client device in which various embodiments may be implemented. For example, a user may submit a request such as an account request pertaining to his or her account, or another account, via a client device. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

As shown in this example, a client device 600 may include one or more central processing units (CPUs) 622, which may be coupled via connection 624 to a power supply 626 and a memory 630. The memory 630 may include random access memory (RAM) 632 and read only memory (ROM) 634. The ROM 634 may include a basic input/output system (BIOS) 640.

The RAM 632 may include an operating system 641. More particularly, a client device may include or may execute a variety of operating systems, including a personal computer operating system, such as a Windows, iOS or Linux, or a mobile operating system, such as iOS, Android, or Windows Mobile, or the like. The client device 600 may also include or may execute a variety of possible applications 642 (shown in RAM 632), such as a client software application such as messenger 643, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 600 may also include or execute an application to communicate content, such as, for example, textual content, multimedia content, or the like, which may be stored in data storage 644. A client device may also include or execute an application such as a browser 645 to perform a variety of possible tasks, such as browsing, searching, playing various forms of content, including locally stored or streamed video, or games (such as fantasy sports leagues).

The client device 600 may send or receive signals via one or more interface(s). As shown in this example, the client device 600 may include one or more network interfaces 650. The client device 600 may include an audio interface 652. In addition, the client device 600 may include a display 654 and an illuminator 658. The client device 600 may further include an Input/Output interface 660, as well as a Haptic Interface 662 supporting tactile feedback technology.

The client device 600 may vary in terms of capabilities or features. Claimed subject matter is intended to cover a wide range of potential variations. For example, a cell phone may include a keypad such 656 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 664 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 7:
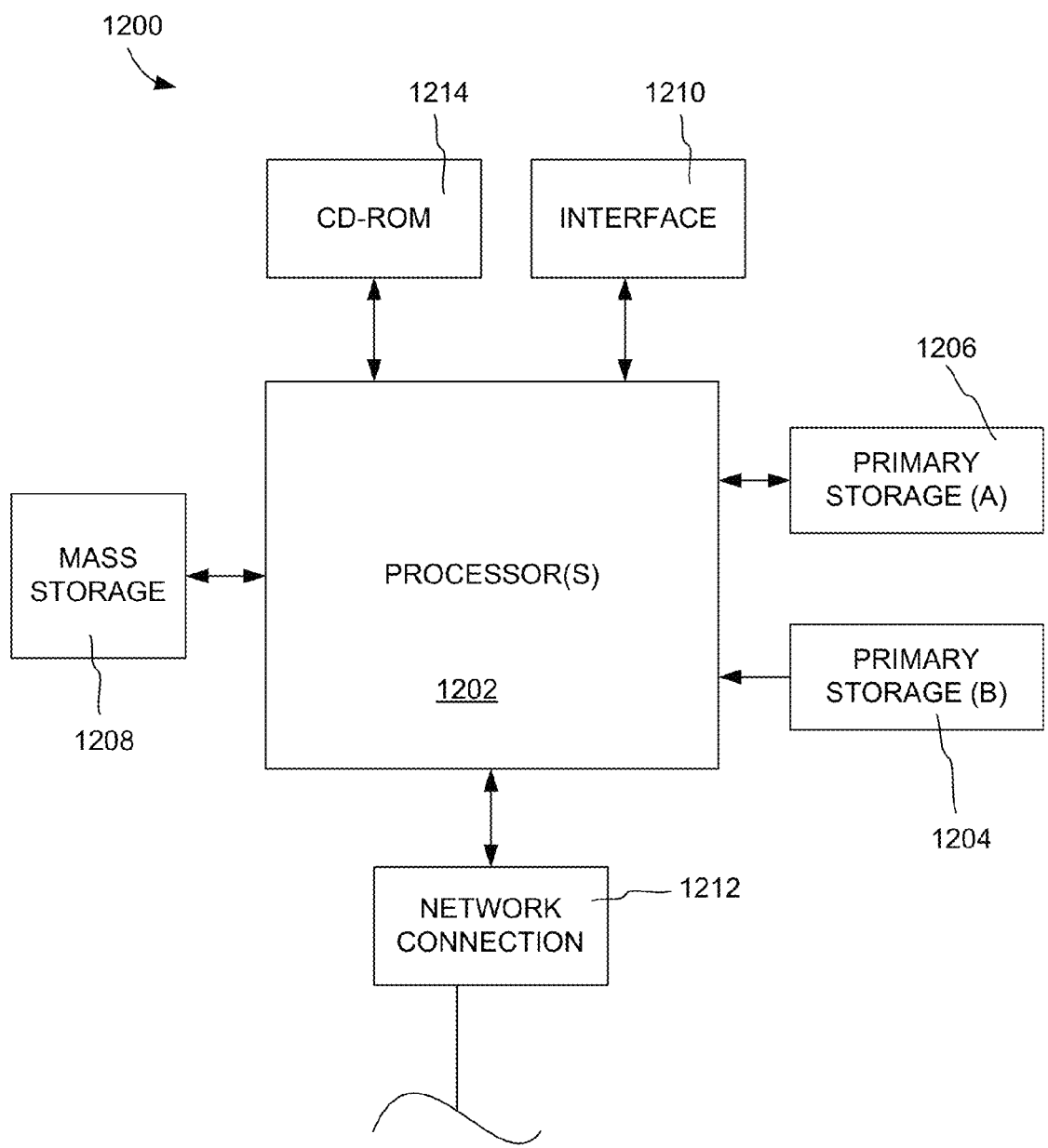
FIG. 7 is a schematic diagram illustrating an example computer system in which various embodiments may be implemented.

FIG. 7 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive, and are not to be limited to the details given herein, but may be modified within the scope and equivalents of the appended claims.

What is claimed is:

1. A method, comprising:
   obtaining an indication of a first request pertaining to a first user account;
   determining that an account type of the first user account is a first one of two or more account types;
   selecting a first subset of two or more data stores or queues based, at least in part, on the account type of the first user account, wherein the first subset of the two or more data stores or queues includes a relational database;
   storing, updating, deleting, or querying first information in a data store or queue in the first subset of the two or more data stores or queues, the first information pertaining to at least one action indicated by the first request;
   obtaining an indication of a second request pertaining to a second user account;
   determining that the account type of the second user account is a second one of the two or more account types;
   selecting a second subset of the two or more data stores or queues based, at least in part, on the account type of the second user account, wherein the second subset of the two or more data stores or queues does not include a relational database; and
   storing, updating, deleting, or querying second information in a data store or queue in the second subset of the two or more data stores or queues, the second information pertaining to at least one action indicated by the second request.

2. The method of claim 1, wherein the first or second user account pertains to goods or services provided to an account owner.

3. The method of claim 1, wherein the first or second user account is managed by a company that provides goods or services to an account owner, and wherein the user account indicates an amount of the goods or services provided to the account owner during a period of time and/or an amount charged to the account owner for the goods or services provided to the account owner during the period of time.

4. The method of claim 3, wherein the first or second request is received from the company.

5. The method of claim 1, wherein the first or second request is received from the account owner.

6. The method of claim 1, wherein the first or second request is generated in response to a specific type of online activity of an account owner or a complaint pertaining to the account owner.

7. The method of claim 1, wherein the first or second request is a delete account request, suspend account request, activate account request, deactivate account request, or create account request.

8. An apparatus, comprising:
   a processor; and
   a memory, at least one of the processor or the memory being adapted for:
      obtaining an indication of a first request pertaining to a first user account;
      determining an account type of the first user account;
      after determining that the account type of the first user account is a first one of two or more account types, selecting a first subset of two or more data stores or queues based, at least in part, on the account type of the first user account, wherein the first subset of the two or more data stores or queues includes a relational database;
      storing, updating, deleting, or querying first information in a data store or queue in the first subset of the two or more data stores or queues, the first information pertaining to at least one action indicated by the first request;
      obtaining an indication of a second request pertaining to a second user account;
      determining the account type of the second user account;
      after determining that the account type of the second user account is a second one of the two or more account types, selecting a second subset of the two or more data stores or queues based, at least in part, on the account type of the second user account, wherein the second subset of the two or more data stores or queues does not include a relational database; and
      storing, updating, deleting, or querying second information in a data store or queue in the second subset of the two or more data stores or queues, the second information pertaining to at least one action indicated by the second request.

9. The apparatus of claim 8, wherein selecting the second subset of the two or more data stores or queues based, at least in part, on the account type of the second user account includes selecting the first or second subset of the two or more data stores or queues based, at least in part, on whether the account type of the second user account is one of a first set of account types or a second set of account types.

10. The apparatus of claim 8, wherein the first subset of the two or more data stores consists of relational databases.

11. The apparatus of claim 9, further comprising: ascertaining that the account type of the second user account is one of the second set of account types.

12. The apparatus of claim 8, wherein selecting the second subset of two or more data stores or is further performed based, at least in part, upon a request type of the second request.

13. The apparatus of claim 8, at least one of the processor or the memory being further adapted for performing steps, further comprising:
selecting the second subset of the two or more data stores or queues based, at least in part, upon the account type of the second user account and a type of the second request; and
storing information pertaining to the second user account based, at least in part, on a result of selecting the second subset of the two or more data stores or queues.

14. The apparatus of claim 13, at least one of the processor or the memory being further adapted for performing steps, further comprising:
identifying one or more actions to be performed based, at least in part, upon the account type of the second user account and/or the type of the second request.

15. The apparatus of claim 8, wherein the two or more account types comprise at least one of a parent account, a master account, a sub-account, a partner account, a paid account, a free account, a simple account, a complex account, an inactive account, or an abusive account.

16. A non-transitory computer-readable medium storing thereon computer-readable instructions configured to perform operations, comprising:
obtaining an indication of a first request pertaining to a first user account;
determining an account type of the first user account;
after determining that the account type of the first user account is a first one of two or more account types, selecting a first subset of two or more data stores or queues based, at least in part, on the account type of the first user account, wherein the first subset of the two or more data stores or queues includes a relational database;
storing, updating, deleting, or querying first information in a data store or queue in the first subset of the two or more data stores or queues, the first information pertaining to at least one action indicated by the first request;
obtaining an indication of a second request pertaining to a second user account;
determining the account type of the second user account;
after determining that the account type of the second user account is a second one of the two or more account types, selecting a second subset of the two or more data stores or queues based, at least in part, on the account type of the second user account, wherein the second subset of the two or more data stores or queues does not include a relational database; and
storing, updating, deleting, or querying second information in a data store or queue in the second subset of the two or more data stores or queues, the second information pertaining to at least one action indicated by the second request.

17. The apparatus of claim 14, further comprising:
scheduling the one or more actions such that each of the one or more actions is scheduled to occur at a corresponding time; and
performing the one or more actions in accordance with the scheduling.

18. The apparatus of claim 17, wherein performing the one or more actions in accordance with the scheduling comprises performing each of the one or more actions at or after the corresponding time.

19. The non-transitory computer-readable medium of claim 16, further comprising:
identifying one or more actions corresponding to the account type and/or a request type of the second request, wherein the one or more actions include a plurality of actions that correspond to a plurality of states in a lifecycle; and
performing the plurality of actions in a particular order in accordance with the plurality of states of the lifecycle.

20. The non-transitory computer-readable medium of claim 16, further comprising:
identifying a plurality of actions corresponding to the account type and/or a request type of the second request;
performing the plurality of actions in sequential order.

21. The non-transitory computer-readable medium of claim 16, further comprising:
selecting one of two or more storage engines based, at least in part, upon the account type of the second user account; and
providing information pertaining to the second user account and/or the at least one action indicated by the second request to the selected one of the two or more storage engines.

22. The method of claim 1, further comprising:
changing a state of the second user account from a first state to a second state based, at least in part, on the account type of the second user account.

23. The method of claim 1, further comprising:
determining a state of the second user account;
wherein the data store or queue in the second subset of the two or more data stores or queues is selected further based, at least in part, upon the state of the second user account.

24. The apparatus of claim 10, wherein the relational databases comprise SQL databases.

25. The method of claim 1, wherein the account type of the first user account is one of a first set of account types and the account type of the second user account is one of a second set of account types, wherein the first set of account types comprises a partner account or a dependent account, and wherein the second set of account types comprises an independent account.

* * * * *